Patented Oct. 31, 1922.

1,433,979

UNITED STATES PATENT OFFICE.

CHARLES W. ARCHER, OF GARY, INDIANA.

PREPARATION FOR THE TREATMENT OF PYORRHEA.

No Drawing. Application filed September 14, 1920. Serial No. 410,220.

*To all whom it may concern:*

Be it known that I, (Dr.) CHARLES W. ARCHER, a citizen of the United States, residing at Gary, in the county of Lake and State of Indiana, have invented new and useful Improvements in Preparations for the Treatment of Pyorrhea, of which the following is a specification.

The present invention provides a novel and improved preparation for the removal of tartar from the teeth and for the treatment of pyorrhea, it being capable of convenient use and is not distasteful to the patient.

The preparation is compounded in substantially the following proportions:

1 pound of glycerinated dialized iron,
38 grains of saccharose,
2.56 grains of atropine sulphate.

The preparation is compounded by thoroughly mixing and dissolving the atropine sulphate in the iron, after which the saccharose is added and the mixture is again stirred thoroughly, after which the preparation is ready for packing or for use.

While the preparation consists of the constituents above noted and it is preferable to compound these constituents in the proportions stated, it will be understood that the proportions of the constituents may be varied to some extent, without impairing the efficiency of the preparation.

The preparation which is in liquid form may be used by introducing about one quarter or one third of an ounce into the mouth and permitting it to remain therein for a period of about five minutes, the treatment being repeated at suitable intervals until the tartar has been dissolved or the pyorrhea has been relieved.

The dialized iron forming a constituent of the preparation, contains oxychloride of iron which reacts when it comes in contact with the tartar on the teeth and which is composed of calcium carbonate and calcium phosphate, this reaction producing soluble salts which readily dissolve. The dialized iron also contains large amounts of nascent chlorine which is a strong antiseptic. The saccharose serves to hold the dialized iron in solution. The atropine sulphate is an astringent which acts to contract the tissues adjacent to the teeth, temporarily, after which a reaction occurs and the blood capillaries are dilated, thus permitting an increased flow of blood to the affected tissue. After the first or temporary contraction of the tissues, a relaxation occurs which permits increased secretions in the mouth for the dissolution of the soluble salts produced from the tartar.

I claim as my invention:—

1. A preparation of the character described, comprising glycerinated dialized iron, saccharose and atropine sulphate.

2. A preparation of the character described, consisting of the following constituents in substantially the proportions named: 1 pound of glycerinated dialized iron, 38 grains of saccharose and 2.56 grains of atropine sulphate.

In testimony whereof I have hereunto set my hand in presence of two subscribing witnesses.

CHARLES W. ARCHER.

Witnesses:
J. GLENN HARRIS,
ELIZABETH MORZAG.